United States Patent
Clegg et al.

[11] Patent Number: 6,026,978
[45] Date of Patent: Feb. 22, 2000

[54] COOLER

[76] Inventors: Geniel Clegg, 585 W. 700 North; Terra Sharp, 85 W. 700 North, both of Orem, Utah 84057

[21] Appl. No.: 09/247,992

[22] Filed: Feb. 11, 1999

[51] Int. Cl.[7] ...................................................... B65D 5/36
[52] U.S. Cl. ................................... 220/592.1; 220/23.83; 220/23.89; 220/528
[58] Field of Search ........................... 220/592.1, 592.15, 220/23.83, 23.87, 23.88, 23.89, 528, 915.1, 915.2

[56] References Cited

U.S. PATENT DOCUMENTS

| | | | |
|---|---|---|---|
| 2,627,993 | 2/1953 | Hafner | 220/23.89 X |
| 2,731,996 | 1/1956 | Hayes | 220/528 X |
| 3,589,554 | 6/1971 | Smith | 220/23.83 |
| 4,759,467 | 7/1988 | Byrne | 220/528 X |
| 4,872,589 | 10/1989 | Englehart | 220/528 X |
| 4,899,904 | 2/1990 | Dooley et al. | 220/23.89 X |
| 5,246,151 | 9/1993 | Jabara | 220/528 X |
| 5,253,756 | 10/1993 | Goekler | 220/528 X |
| 5,823,424 | 10/1998 | Allen | 220/528 X |

*Primary Examiner*—Steven Pollard

[57] ABSTRACT

A cooler for providing side compartments for holding ice separate from an inner container for holding food and beverages. The cooler includes an outer chest with an open top and an outer lid covering the open top. An open inner frame is position in the open top of the outer chest and spaced apart from the outer chest. The inner frame has a plurality of outwardly extending generally connecting tabs coupled to the outer chest to connect the inner frame to the outer chest. Each adjacent pair of connecting tabs define therebetween a passage between the inner frame and the outer chest. An inner container is provided in the outer chest and is positioned in the center hole of the inner frame. The inner container is spaced apart from the outer chest to define an outer reservoir therebetween.

8 Claims, 3 Drawing Sheets

COOLER

BACKGROUND OF THE INVENTION

1. Field of the Invention

The present invention relates to coolers and more particularly pertains to a new cooler for providing side compartments for holding ice separate from an inner container for holding food and beverages.

2. Description of the Prior Art

The use of coolers is known in the prior art. More specifically, coolers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,064,088 by Steffers; U.S. Pat. No. 4,648,512 by Tarozzi et al.; U.S. Pat. No. 3,979,007 by Thornbloom, Jr.; U.S. Pat. No. 3,791,547 by Branscum; U.S. Pat. No. 2,663,391 by Kuhns; and U.S. Pat. No. Des. 309,239 by Deines et al.

While these devices fulfill their respective, particular objectives and requirements, the aforementioned patents do not disclose a new cooler. The inventive device includes an outer chest with an open top and an outer lid covering the open top. An open inner frame is position in the open top of the outer chest and spaced apart from the outer chest. The inner frame has a plurality of outwardly extending generally connecting tabs coupled to the outer chest to connect the inner frame to the outer chest. Each adjacent pair of connecting tabs define therebetween a passage between the inner frame and the outer chest. An inner container is provided in the outer chest and is positioned in the center hole of the inner frame. The inner container is spaced apart from the outer chest to define an outer reservoir therebetween.

In these respects, the cooler according to the present invention substantially departs from the conventional concepts and designs of the prior art, and in so doing provides an apparatus primarily developed for the purpose of providing side compartments for holding ice separate from an inner container for holding food and beverages.

SUMMARY OF THE INVENTION

In view of the foregoing disadvantages inherent in the known types of coolers now present in the prior art, the present invention provides a new cooler construction wherein the same can be utilized for providing side compartments for holding ice separate from an inner container for holding food and beverages.

The general purpose of the present invention, which will be described subsequently in greater detail, is to provide a new cooler apparatus and method which has many of the advantages of the coolers mentioned heretofore and many novel features that result in a new cooler which is not anticipated, rendered obvious, suggested, or even implied by any of the prior art coolers, either alone or in any combination thereof.

To attain this, the present invention generally comprises an outer chest with an open top and an outer lid covering the open top. An open inner frame is position in the open top of the outer chest and spaced apart from the outer chest. The inner frame has a plurality of outwardly extending generally connecting tabs coupled to the outer chest to connect the inner frame to the outer chest. Each adjacent pair of connecting tabs define therebetween a passage between the inner frame and the outer chest. An inner container is provided in the outer chest and is positioned in the center hole of the inner frame. The inner container is spaced apart from the outer chest to define an outer reservoir therebetween.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cooler apparatus and method which has many of the advantages of the coolers mentioned heretofore and many novel features that result in a new cooler which is not anticipated, rendered obvious, suggested, or even implied by any of the prior art coolers, either alone or in any combination thereof.

It is another object of the present invention to provide a new cooler which may be easily and efficiently manufactured and marketed.

It is a further object of the present invention to provide a new cooler which is of a durable and reliable construction.

An even further object of the present invention is to provide a new cooler which is susceptible of a low cost of manufacture with regard to both materials and labor, and which accordingly is then susceptible of low prices of sale to the consuming public, thereby making such cooler economically available to the buying public.

Still yet another object of the present invention is to provide a new cooler which provides in the apparatuses and methods of the prior art some of the advantages thereof, while simultaneously overcoming some of the disadvantages normally associated therewith.

Still another object of the present invention is to provide a new cooler for providing side compartments for holding ice separate from an inner container for holding food and beverages.

Yet another object of the present invention is to provide a new cooler which includes an outer chest with an open top and an outer lid covering the open top. An open inner frame is position in the open top of the outer chest and spaced apart from the outer chest. The inner frame has a plurality of outwardly extending generally connecting tabs coupled to the outer chest to connect the inner frame to the outer chest. Each adjacent pair of connecting tabs define therebetween a passage between the inner frame and the outer chest. An inner container is provided in the outer chest and is positioned in the center hole of the inner frame. The inner container is spaced apart from the outer chest to define an outer reservoir therebetween.

Still yet another object of the present invention is to provide a new cooler that keeps the food and beverages separated from the ice so that the water from melted ice does not soak the food and beverages.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there arc illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
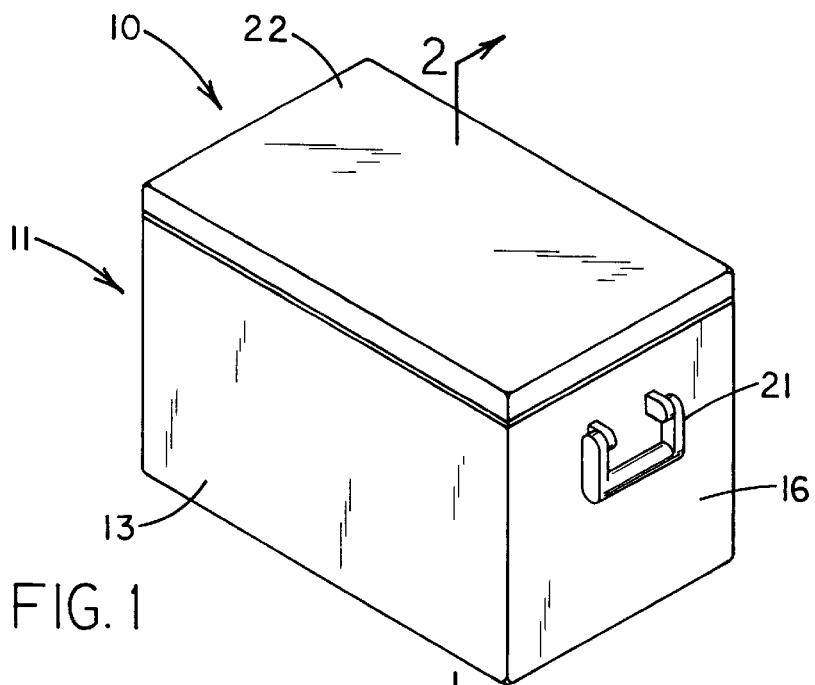
FIG. 1 is a schematic perspective view of a new cooler with the outer lid closed according to the present invention.
Figure 2:
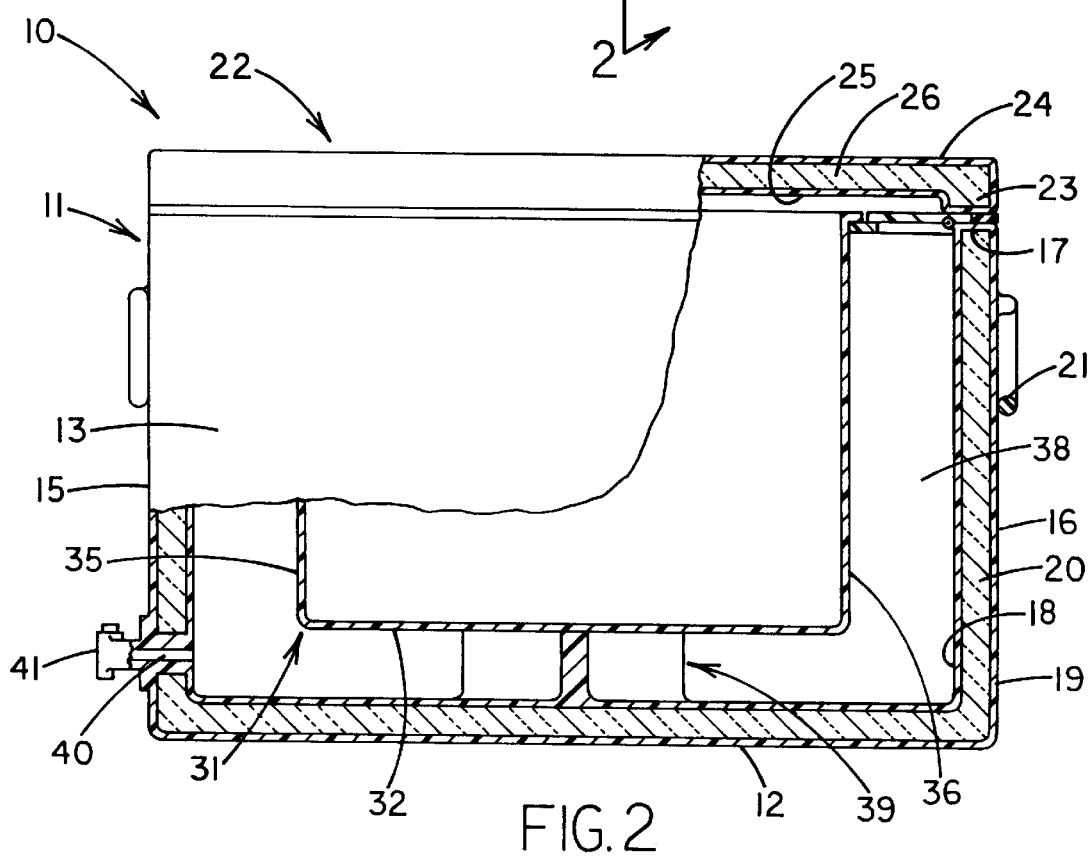
FIG. 2 is a schematic breakaway cross sectional view of the present invention taken from line 2—2 of FIG. 1.
Figure 3:
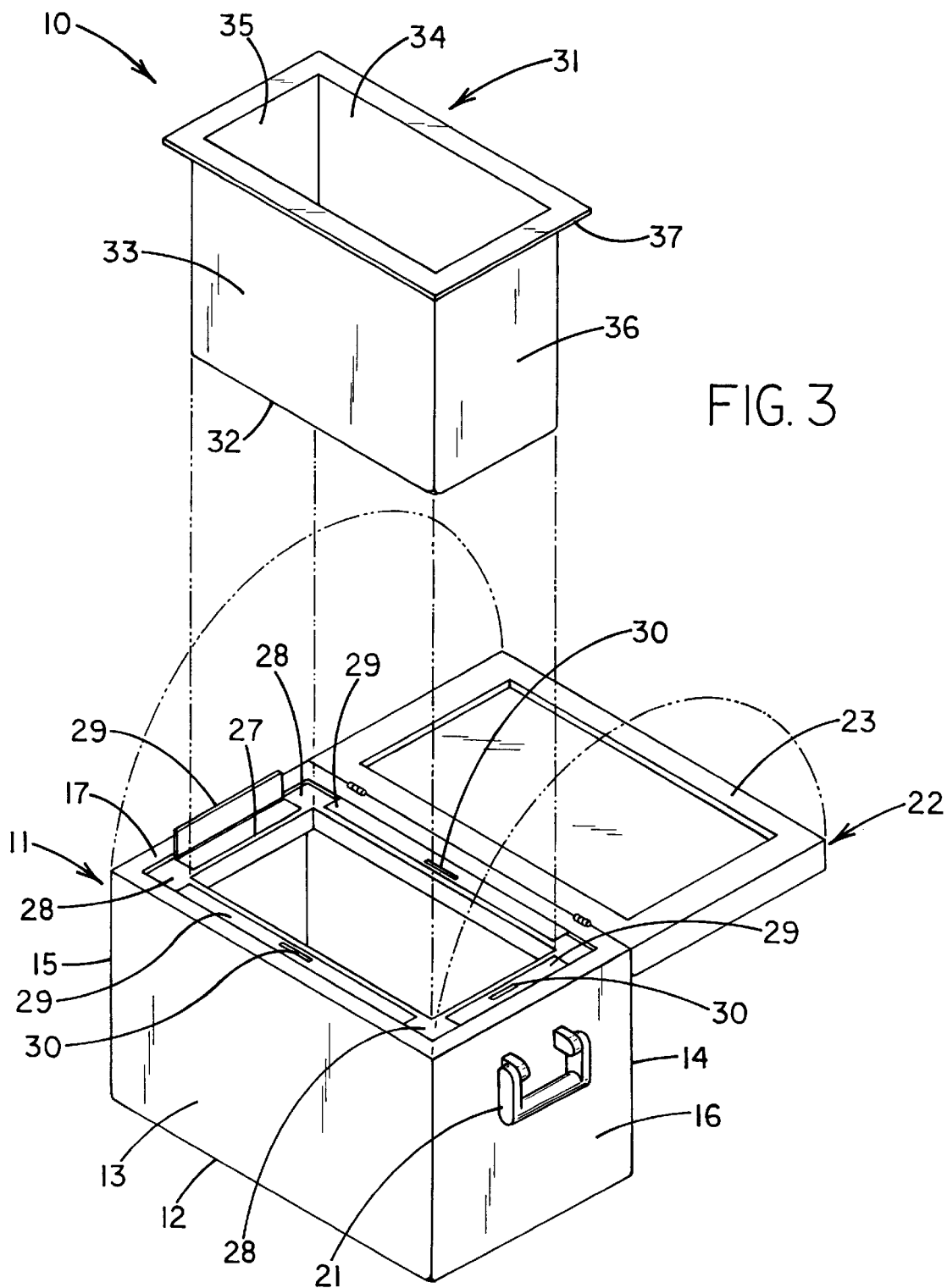
FIG. 3 is a schematic exploded perspective view of the present invention.
Figure 4:
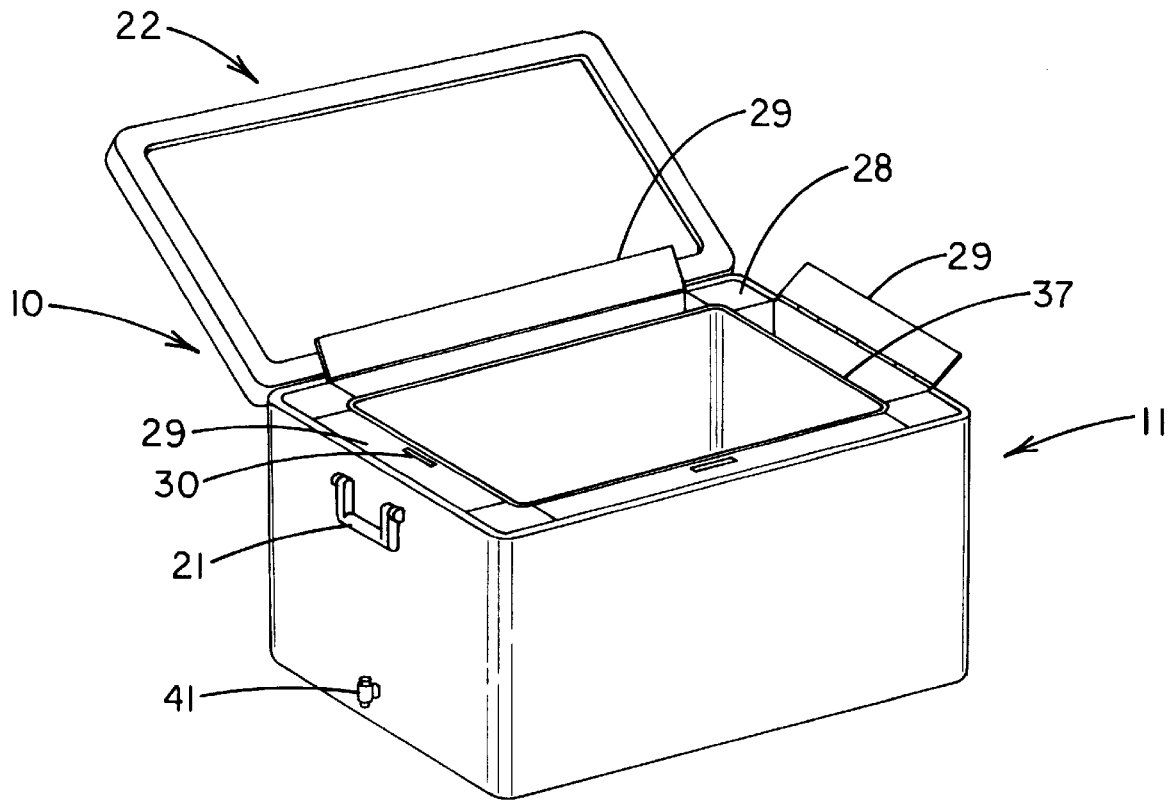
FIG. 4 is a schematic perspective view of the present invention with the outer lid open.
Figure 5:
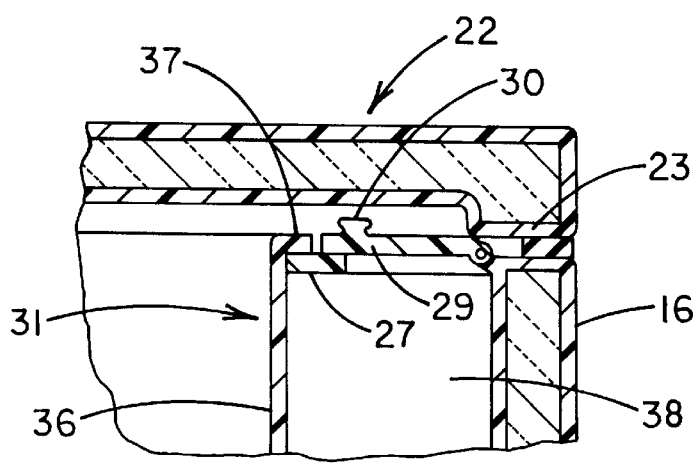
FIG. 5 is a schematic enlarged cross sectional view of a portion of the present invention illustrated in FIG. 2.

With reference now to the drawings, and in particular to FIGS. 1 through 5 thereof, a new cooler embodying the principles and concepts of the present invention and generally designated by the reference numeral 10 will be described.

As best illustrated in FIGS. 1 through 5, the cooler 10 generally comprises an outer chest with an open top and an outer lid covering the open top. An open inner frame is position in the open top of the outer chest and spaced apart from the outer chest. The inner frame has a plurality of outwardly extending generally connecting tabs coupled to the outer chest to connect the inner frame to the outer chest. Each adjacent pair of connecting tabs define therebetween a passage between the inner frame and the outer chest. An inner container is provided in the outer chest and is positioned in the center hole of the inner frame. The inner container is spaced apart from the outer chest to define an outer reservoir therebetween.

In closer detail, the cooler 10 comprises a generally rectangular outer chest 11 having an open top, a generally rectangular bottom wall 12, spaced apart generally rectangular front and back walls 13,14, and a spaced apart pair of generally rectangular side walls 15,16 extending between the front and back walls of the outer chest. The outer chest has a generally rectangular top edge 17 defining the open top of the outer chest. Preferably, the front and back walls of the outer chest lie in substantially parallel planes to one another and the side walls of the outer chest lie in substantially parallel planes to one another substantially perpendicular to the planes of the front and back walls of the outer chest. In this preferred embodiment, the top edge and the bottom wall of the outer chest lie in substantially parallel planes to one another. Additionally, the front, back, and side walls preferably lie in planes extending substantially perpendicular to the bottom wall of the outer chest.

The walls of the outer chest preferably comprise spaced apart inner and outer shell walls 18,19 and an inner core 20 substantially filling the space between the inner and outer shell walls. The inner and outer shell walls of the outer chest are connected together at the top edge of the outer chest. The inner and outer shell walls ideally comprise a generally rigid plastic material while the inner core of the outer chest ideally comprises a foamed material having a greater insulating factor than the inner and outer shell walls such that inner core of the outer chest has a greater resistance to the passage of heat therethrough than the inner and outer shell walls.

Preferably, each of the side walls of the outer chest has a carrying handle 21 for permitting a user to carry the outer chest with the carrying handles.

A generally rectangular outer lid 22 substantially covers the open top of the outer chest and is pivotally coupled to the back wall of the outer chest by hinges to permit raising of the lid to permit access into the outer chest through the open top of the outer chest. The outer lid has a generally rectangular lower lip 23 downwardly extending along an outer perimeter of the outer lid which rests on the top edge of the outer chest. Like the outer chest, the outer lid preferably comprises spaced apart top and bottom shell walls 24,25 and an inner core 26 substantially filling the space between the top and bottom shell walls. The top and bottom shell walls of the outer lid are connected together at the lower lip of the outer lid. The top and bottom shell walls ideally comprise a generally rigid plastic material while the inner core of the outer lid ideally comprises a foamed material having a greater insulating factor than the top and bottom shell walls such that inner core of the outer lid has a greater resistance to the passage of heat therethrough than the top and bottom shell walls.

A generally rectangular open inner frame 27 is position in the open top of the outer chest. The inner frame is spaced apart from the front, back, and side walls of the outer chest. The inner frame and the top edge of the outer chest preferably lie in generally parallel planes to one another. The inner frame has a plurality of corners and defines a generally rectangular center hole therethrough. Each of the corners of the inner frame has an outwardly extending generally rectangular connecting tab 28. The connecting tabs are coupled to the outer chest to connect the corners of the inner frame to the outer chest. Preferably, the inner frame and the connecting tabs generally lie in a common plane with one another.

The connecting tabs arc spaced apart from one another with the connecting tabs of each adjacent pair of corners of the inner frame defining therebetween a generally rectangular passage between the inner frame and the outer chest. Each of the passages has an associated generally rectangular inner lid 29 substantially covering the respective passage. Each of the inner lids is pivotally coupled to the outer chest adjacent the top edge of the outer chest such that the inner lids pivot upwardly and outwardly away from the inner frame. Preferably, each of the inner lids has a lifting handle 30 on an upper face of the respective inner lid to aid pivoting of the respective inner lid to expose the associated passage.

A generally rectangular inner container 31 is provided having a generally rectangular bottom panel 32 and a perimeter wall upwardly extending around the bottom panel. The perimeter wall of the inner container comprises spaced apart generally rectangular front and back panels 33,34, and a spaced apart pair of generally rectangular side panels 35,36 extending between the front and back panels of the inner container. The perimeter wall of the inner container has a generally rectangular upper edge defining an upper opening into the inner container. The perimeter wall of the inner container preferably has an outwardly extending outer lip 37 around the upper edge of the perimeter wall of the inner container. Ideally, the outer lip and the upper edge of the perimeter wall of the inner container lie in a common plane with one another substantially parallel to the bottom panel of the inner container.

The inner container is provided in the outer chest and is positioned in the center hole of the inner frame. Preferably, the inner container is removably inserted into the outer chest through the open top of the outer container and through the center hole of the inner frame to permit removal of the inner container from the outer chest for cleaning and repairs. The outer lip of the perimeter wall of the inner container is rested on the inner frame to support the inner container on the inner frame.

The inner container is spaced apart from the outer chest to define an outer reservoir 38 therebetween. The outer reservoir is designed for holding ice therein between the outer chest and the inner container such that the inner container is surrounded by ice in the outer chest. Specifically, the bottom panel of the inner container is positioned towards and spaced apart from the bottom wall of the outer chest. Preferably, the bottom panel of the inner container and the bottom wall of the outer chest lie in generally parallel planes to one another. The front panel of the inner container is positioned towards and spaced apart from the front wall of the outer chest so that the front panel of the inner container and the front wall of the outer chest preferably lie in generally parallel planes to one another. The back panel of the inner container is positioned towards and spaced apart from the back wall of the outer chest. The back panel of the inner container and the back wall of the outer chest lie in generally parallel planes to one another. Each of the side panels of the inner container is positioned towards and spaced apart from a corresponding side wall of the outer chest with each of the side panels of the inner container and the corresponding side wall of the outer chest lying in generally parallel planes to one another.

Preferably, the bottom wall of the outer chest has a resting pedestal 39 upwardly extending therefrom on which bottom panel of the inner container is rested to support the bottom panel of the inner container above the bottom wall of the outer chest. The resting pedestal preferably has a generally cross-shaped configuration comprising a first portion extending between the side walls of the outer chest substantially parallel to the front and back walls of the outer chest and a second portion extending between the front and back walls of the outer chest substantially parallel to the side walls of the outer chest.

The outer chest has a drain hole 40 therethrough to permit draining of fluid in the reservoir, the drain hole is located in one of the side walls of the outer chest. Preferably, the outer chest has a spigot 41 outwardly extending from the drain hole, the spigot permitting selective opening and closing of the drain hole.

In use, a user, fills the inner container with food and beverage and fills the reservoir between the inner container and the outer chest with ice to keep the food and beverages in the inner container cool in the cooler.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cooler, comprising:

an outer chest having an open top;

an outer lid substantially covering said open top of said outer chest;

an open inner frame having a centerhole being position in said open top of said outer chest and spaced apart from said outer chest;

said inner frame having a plurality of outwardly extending generally connecting tabs coupled to said outer chest to connect said inner frame to said outer chest;

each adjacent pair of connecting tabs defining therebetween a passage between said inner frame and said outer chest;

an inner container having an upper opening therein and being provided in said outer chest and being positioned in said center hole of said inner frame; and said inner container being spaced apart from said outer chest to define an outer reservoir therebetween.

2. The cooler of claim 1, wherein said walls of said outer chest comprise spaced apart inner and outer shell walls and an inner core substantially filling the space between said inner and outer shell walls, said inner and outer shell walls of said outer chest being connected together at a top edge of said outer chest defining said open top of said outer chest.

3. The cooler of claim 1, wherein said outer lid is pivotally coupled to said outer chest.

4. The cooler of claim 1, said outer lid has a lower lip downwardly extending along an outer perimeter of said outer lid, said lower lip of said outer lid being rested on a top edge of said outer chest defining said open top of said outer chest.

5. The cooler of claim 1, wherein each of said passages has an associated inner lid substantially covering the respective passage, each of said inner lids being pivotally coupled to said outer chest.

6. The cooler of claim 1, wherein said inner container has an outwardly extending outer lip therearound, said outer lip being rested on said inner frame.

7. The cooler of claim 1, wherein said outer chest having a resting pedestal upwardly extending therefrom, said inner container being rested on said resting pedestal.

8. A cooler, comprising:

an outer chest having an open top, a generally rectangular bottom wall, spaced apart generally rectangular front and back walls, and a spaced apart pair of generally rectangular side walls extending between said front and back walls of said outer chest, said outer chest having a generally rectangular top edge defining said open top of said outer chest;

said front and back walls of said outer chest lying in substantially parallel planes to one another, said side walls of said outer chest lying in substantially parallel planes to one another substantially perpendicular to said planes of said front and back walls of said outer chest;

said top edge and said bottom wall of said outer chest lying in substantially parallel planes to one another, said front, back, and side walls lying in planes extending substantially perpendicular to said bottom wall of said outer chest;

said walls of said outer chest comprising spaced apart inner and outer shell walls and an inner core substantially filling the space between said inner and outer shell walls;

said inner and outer shell walls of said outer chest being connected together at said top edge of said outer chest;

said inner and outer shell walls comprising a generally rigid plastic material;

said inner core of said outer chest comprising a foamed material having a greater insulating factor than said inner and outer shell walls such that inner core of said outer chest has a greater resistance to the passage of heat therethrough than said inner and outer shell walls;

each of said side walls of said outer chest having a carrying handle;

a generally rectangular outer lid substantially covering said open top of said outer chest, said outer lid being pivotally coupled to said back wall of said outer chest;

said outer lid having a generally rectangular lower lip downwardly extending along an outer perimeter of said outer lid, said lower lip of said outer lid being rested on said top edge of said outer chest;

said outer lid comprising spaced apart top and bottom shell walls and an inner core substantially filling the space between said top and bottom shell walls;

said top and bottom shell walls of said outer lid being connected together at said lower lip of said outer lid;

said top and bottom shell walls comprising a generally rigid plastic material;

said inner core of said outer lid comprising a foamed material having a greater insulating factor than said top and bottom shell walls such that inner core of said outer lid has a greater resistance to the passage of heat therethrough than said top and bottom shell walls;

a generally rectangular open inner frame having a center hole being position in said open top of said outer chest, said inner frame being spaced apart from said front, back, and side walls of said outer chest;

said inner frame and said top edge of said outer chest lying in generally parallel planes to one another;

said inner frame having a plurality of corners and defining a generally rectangular center hole therethrough;

each of said corners of said inner frame having an outwardly extending generally rectangular connecting tab, said connecting tabs being coupled to said outer chest to connect said corners of said inner frame to said outer chest;

said inner frame and said connecting tabs generally lying in a common plane with one another;

said connecting tabs being spaced apart from one another, said connecting tabs of each adjacent pair of corners of said inner frame defining therebetween a generally rectangular passage between said inner frame and said outer chest;

each of said passages having an associated generally rectangular inner lid substantially covering the respective passage, each of said inner lids being pivotally coupled to said outer chest adjacent said top edge of said outer chest;

a generally rectangular inner container having a generally rectangular bottom panel and a perimeter wall upwardly extending around said bottom panel, said perimeter wall of said inner container comprising spaced apart generally rectangular front and back panels, and a spaced apart pair of generally rectangular side panels extending between said front and back panels of said inner container;

said perimeter wall of said inner container having a generally rectangular upper edge defining an upper opening into said inner container;

said perimeter wall of said inner container having an outwardly extending outer lip around said upper edge of said perimeter wall of said inner container;

said outer lip and said upper edge of said perimeter wall of said inner container lying in a common plane with one another substantially parallel to said bottom panel of said inner container;

said inner container being provided in said outer chest and being positioned in said center hole of said inner frame;

wherein said inner container is removably inserted into said outer chest through said open top of said outer container and through said center hole of said inner frame to permit removal of the inner container from the outer chest;

said outer lip of said perimeter wall of said inner container being rested on said inner frame;

said inner container being spaced apart from said outer chest to define an outer reservoir therebetween;

said bottom panel of said inner container being positioned towards and spaced apart from said bottom wall of said outer chest, said bottom panel of said inner container and said bottom wall of said outer chest lying in generally parallel planes to one another;

said front panel of said inner container being positioned towards and spaced apart from said front wall of said outer chest, said front panel of said inner container and said front wall of said outer chest lying in generally parallel planes to one another;

said back panel of said inner container being positioned towards and spaced apart from said back wall of said outer chest, said back panel of said inner container and said back wall of said outer chest lying in generally parallel planes to one another;

each of said side panels of said inner container being positioned towards and spaced apart from a corresponding side wall of said outer chest, each of said side panels of said inner container and the corresponding side wall of said outer chest lying in generally parallel planes to one another;

said bottom wall of said outer chest having a resting pedestal upwardly extending therefrom, bottom panel of said inner container being rested on said resting pedestal;

said resting pedestal having a generally cross-shaped configuration comprising a first portion extending between said side walls of said outer chest substantially parallel to said front and back walls of said outer chest and a second portion extending between said front and back walls of said outer chest substantially parallel to said side walls of said outer chest;

said outer chest having a drain hole therethrough, said drain hole being located in one of said side walls of said outer chest; and said outer chest having a spigot outwardly extending from said drain hole.

* * * * *